(12) United States Patent  
Raskar et al.

(10) Patent No.: US 7,580,620 B2  
(45) Date of Patent: Aug. 25, 2009

(54) METHOD FOR DEBLURRING IMAGES USING OPTIMIZED TEMPORAL CODING PATTERNS

(75) Inventors: Ramesh Raskar, Cambridge, MA (US); Jack Tumblin, Evanston, IL (US); Amit Agrawal, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 584 days.

(21) Appl. No.: 11/429,694

(22) Filed: May 8, 2006

(65) Prior Publication Data

US 2007/0258706 A1 Nov. 8, 2007

(51) Int. Cl.
*G03B 17/00* (2006.01)
*H04N 5/228* (2006.01)

(52) U.S. Cl. ................................. 396/55; 348/208.99
(58) Field of Classification Search .................. 396/52, 396/55; 348/208.99, 208.4, 208.6, 208.13
See application file for complete search history.

(56) References Cited

U.S. PATENT DOCUMENTS

2006/0119710 A1* 6/2006 Ben-Ezra et al. ........ 348/208.99
2007/0098383 A1* 5/2007 Stavely et al. ................. 396/55

* cited by examiner

*Primary Examiner*—Rodney E Fuller
(74) *Attorney, Agent, or Firm*—Dirk Brinkman; Gene V. Vinokur

(57) ABSTRACT

A method and system deblurs images acquired of a scene by a camera. A light field acquired of a scene is modulated temporally according to a sequence of ons and offs. An optimal coding pattern is selected. The modulated light field is integrated by a sensor of a camera during an exposure time to generate an encoded input image. The encoded input image is decoded according to a pseudo-inverse of a smearing matrix to produce a decoded output image having a reduced blur.

17 Claims, 12 Drawing Sheets

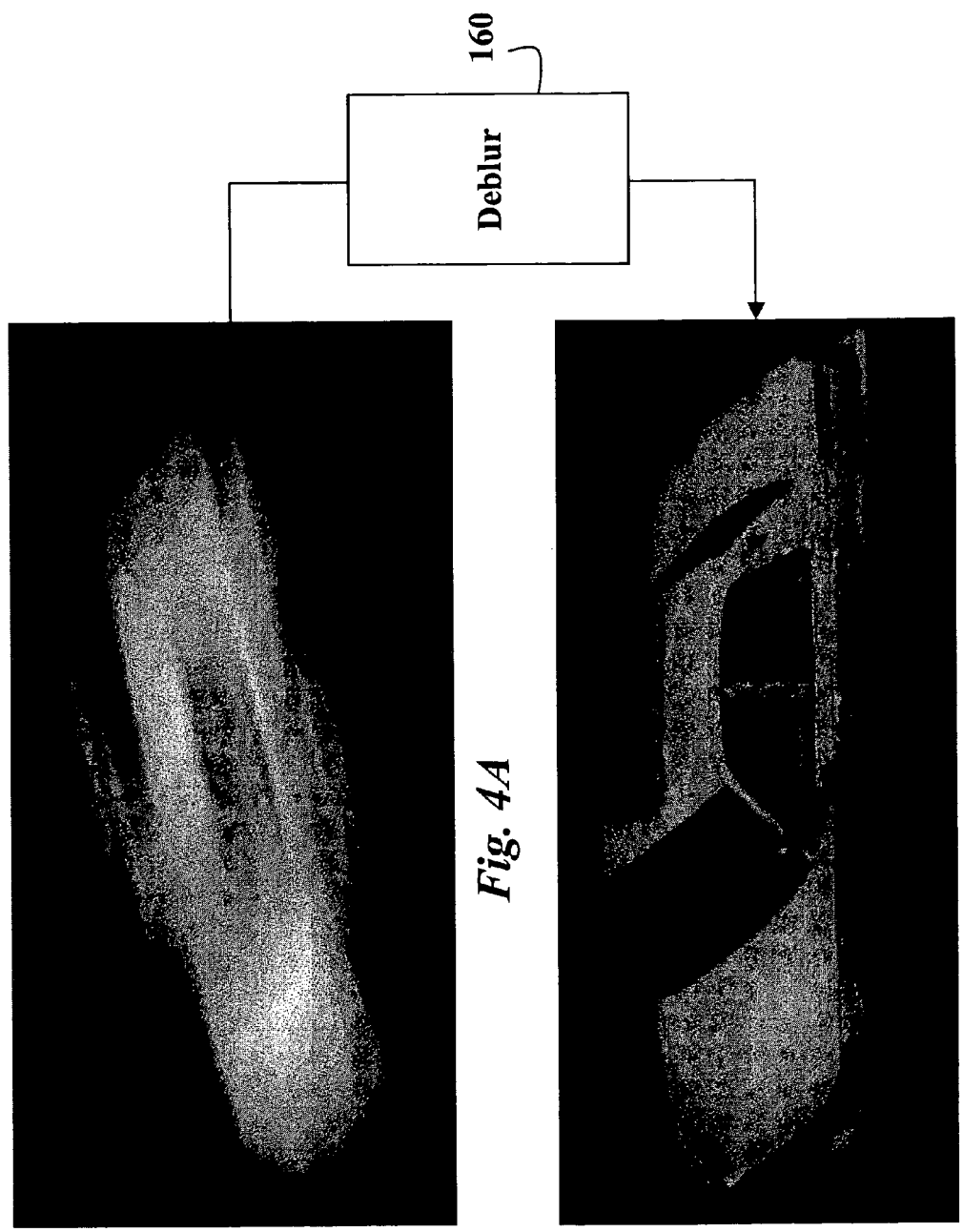

METHOD FOR DEBLURRING IMAGES USING OPTIMIZED TEMPORAL CODING PATTERNS

RELATED APPLICATION

This application is related to U.S. patent application Ser. No. 11/430,233 entitled "Method and Apparatus for Deblurring Images" and co-filed with this application by Ramesh Raskar on May 5, 2006.

FIELD OF THE INVENTION

This invention relates generally to processing images, and more particularly to deblurring images using optimized temporal coding patterns.

BACKGROUND OF THE INVENTION

Movement is an important aid to human visual perception. It helps us see, interpret and better understand our surroundings. Despite its usefulness to human viewers, motion is often the bane of photography. The clearest, most detailed image requires a perfectly stationary camera and scene. This is extremely difficult for amateur photography in natural settings.

Conventional cameras include several manual or automatic controls to deal with various camera and scene parameters, such as focus depth and exposure time. However, the solutions for dealing with motion in a scene are limited. Typically, the exposure time is decreased as the amount of motion increases.

Current imaging practice generally follows an 'instantaneous' ideal, a computation-free, zero-order model of motion selection. Ideally, the exposure time is made the longest that is possible so that moving objects still appear substantially motionless.

It is desired to provide improved sensing methods that will enable digital cameras to use a first-order motion model.

Motion blur is the result of relative motion between the camera and the scene during integration or 'exposure time' while acquiring an image. Motion blurred images can be restored up to lost spatial frequencies by image deconvolution, provided that the motion is shift-invariant, at least locally, and that a blur function, also known as a point spread function (PSF), that caused the blur is known.

However, image deconvolution belongs to a class of ill-posed inverse problems for which the uniqueness of a solution cannot be established and the solutions are oversensitive to perturbations in the input data. Several techniques are known for motion deblurring and reblurring.

Exposure Time Solutions

Shortening the exposure time is a common solution. However, a short exposure time increases noise and unnecessarily penalizes static areas of the image. A high speed camera can capture fast motion, but that is expensive in terms of sensing, bandwidth and storage. A high speed camera also fails to exploit inter-frame coherence. Often, high speed cameras require bright lights. Visually stunning results for high speed objects can be obtained by using a modest exposure time but an extremely narrow-duration flash. However, strobed flash is often impractical in outdoor or distant scenes. In addition, flash only captures an instant of the action and fails to indicate the general movement in the scene.

Smarter Cameras

To overcome camera motion, adaptive optical components can be physically stabilized using inertial sensors that compensate for camera motion. Alternatively, some CMOS cameras perform high-speed frame captures within normal exposure time, enabling multiple image-based motion blur removal. Those techniques are able to produce clear and crisp images, given a reasonable exposure time.

A hybrid imaging system can estimate the PSF using an auxiliary low resolution high frame rate sensor. An accurate PSF makes deblurring possible, even with a long exposure. Those methods compensate for camera motion but do not respond to object motion within the scene.

Video Analysis

Partial information can be combined to estimate and deblur videos based on successive frames of captured by a video camera, or from frames captured by multiple co-located cameras with overlapped exposure times.

Post-Processing Solutions

There are two main classes of methods for deblurring an image given the blur PSF. The first class, in the frequency domain, can use a Wiener filter or a regularized inversion, and entails computation of a Fourier (cosine) transform of the deblurred image. The second class includes iterative updates approaches. These include the Lucy-Richardson algorithm and other updates that iteratively optimize loss indices based on image statistics.

A noisy, short exposure image can also be improved by using color constraints observed in a long exposure photo. Blind deconvolution is widely adopted to enhance a single blurred image, based on various assumptions applied to the PSF. PSF estimation remains a challenging problem for arbitrary motions. And even when the PSF is known, deblurred images are often significantly inferior to the original image due to amplified noise, resampling and quantization issues. Often, it is only possible to deblur small movements.

Coded Sampling

Binary and continuous codes are commonly used in signal processing to modulate signals with a broadband response. The codes include 'chirps' that sweep the carrier over a wide frequency band during the pulse interval. Maximum length sequences (m-sequences) and modified uniform redundant arrays (MURA) are popular choices for coding and decoding by circular convolution. Coded-aperture astronomical imaging uses MURA codes to improve the signal to noise ratio while capturing X-ray and gamma-ray wavelengths unsuitable for conventional lenses.

Broadband signals have applications in a range of technologies, such as spread spectrum coding for noise-robust communication and code division multiplexing (CDMA) to minimize interference with other channels. Acousticians use m-sequences to design two dimensional panels that exhibit minimal sound diffraction.

Consider the problem of deblurring a 1-D signal via deconvolution. The goal is to estimate a signal $S(x)$ that was blurred by a point spread function $P(x)$ of a linear system. Then, a measured image signal $I(x)$ is known to be $$I(x)=P(x)*S(x), \qquad (1)$$

where * denotes convolution. In the ideal case, a good estimate of the image, $S'(x)$, can be recovered via a deconvolution filter $P^+(x)$, such that $$S'(x)=P^+(x)*I(x). \qquad (2)$$

In the case of band-limited point-spread functions or point spread functions with incomplete coverage of the Fourier domain, information is lost and deconvolution is not possible. For example, capturing an image with exposure duration T is equivalent to a convolution with a box filter in the temporal domain. The resultant alteration is a flat blur. In the frequency domain, the signal is multiplied by a band-limited synchronization function with zeros at the intervals of 2/T and significant attenuation at most other frequencies.

To overcome this problem, several methods select their reconstruction from the range of possible solutions using an iterative maximum likelihood estimation approach. One well-known class of techniques use a statistical model for image formation based on a Bayes formula. The Richardson-Lucy algorithm is a non-linear ratio-based method that produces non-negative gray level values. The iterative deconvolution technique is applicable for whole motion blur and assumes the complete signal I(x) is available. But iterative deconvolution fails to handle cases where parts of the scene have different PSFs, such as in the case of a moving object in front of a static textured background. When a part of the moving object is occluded, some values of I(x) are unobservable.

SUMMARY OF THE INVENTION

Conventional cameras leave the shutter open during the exposure time and attempt to deblur the image with image stabilizing and/or deconvolution techniques. Such techniques can reduce whole-image blur due to camera motion, but cannot correct blur from moving occluders. In addition, deconvolution can produce strong noisy artifacts.

The embodiments of the invention minimize motion blur in images acquired of a scene by a camera. Rather than leaving the shutter open for the entire exposure time, the shutter is rapidly 'fluttered'. That is, the shutter is opened and closed in an irregular temporal sequence to produce an encoded image.

The encoded image can then be decoded to improve details in an image of a moving object. The decoding uses linear algebra to separate the encoded-blur image into sharp, stationary foreground and background images.

The embodiments of the invention can deblur images with extremely large motions, textured backgrounds and partial occluders.

It should be noted that the modulating, sampling, and decoding techniques described herein can also be with other energy fields such as ultrasound and sonar sensing. There, the sensed signal is low-pass filtered due to limitations of the device or because the sonar device moved. By using a temporal sampling code, the attenuation of high frequency components can be reduced.

The high frequency sampling technique can also be used for other devices that cause a smear in an image. For example, a lack of focus in a lens causes a defocused blurred image. By placing a high frequency pattern in front of the lens, the pixel blur can be encoded so that a focused sharp image can be recovered later during a decoding process.

It should be noted that the modulating and encoding can be achieved externally or internally in the camera, and can include amplitude, frequency, phase, pulse width, opacity, or polarization modulation of the shutter.

BRIEF DESCRIPTION OF THE DRAWINGS

FIG. 4A is a blurred image according to an embodiment of the invention;

FIG. 4B is a deblurred image corresponding to the image of FIG. 4A;

DETAILED DESCRIPTION OF THE PREFERRED EMBODIMENT

Figure 1A:
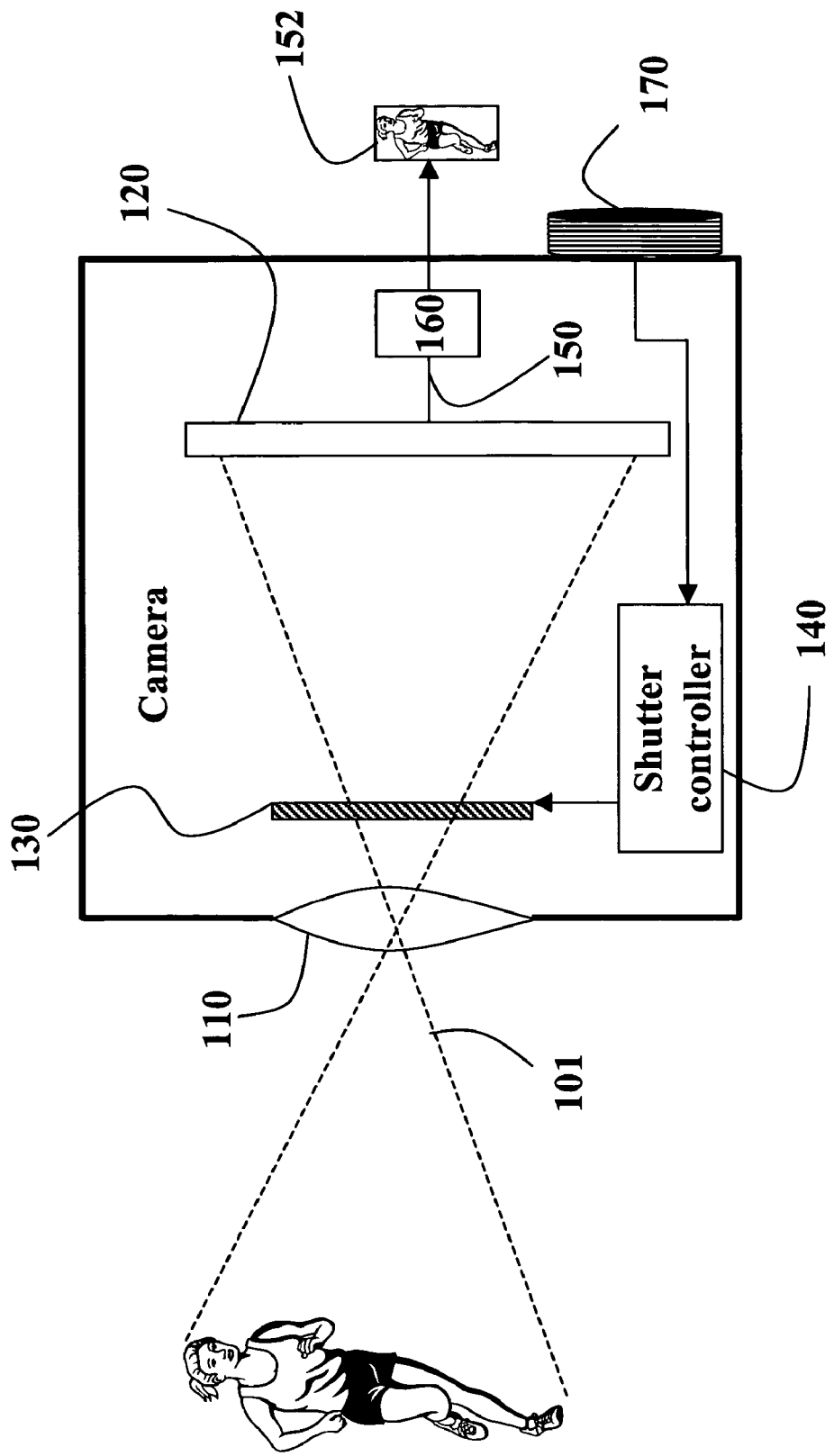
FIGS. 1A, 1B and 1C are schematics of a deblurring camera according to embodiments of the invention.
Figure 1B:
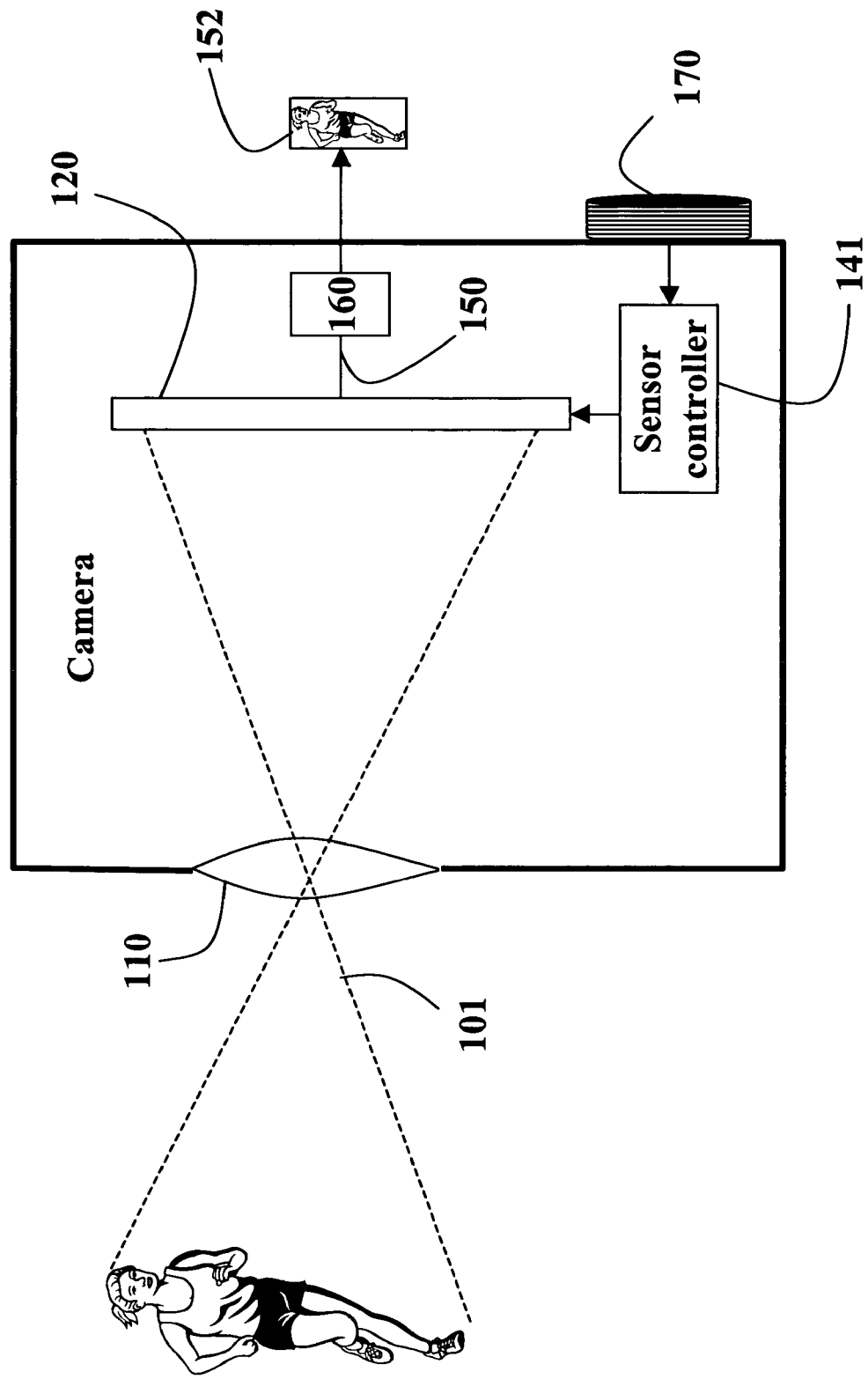
Figure 1C:
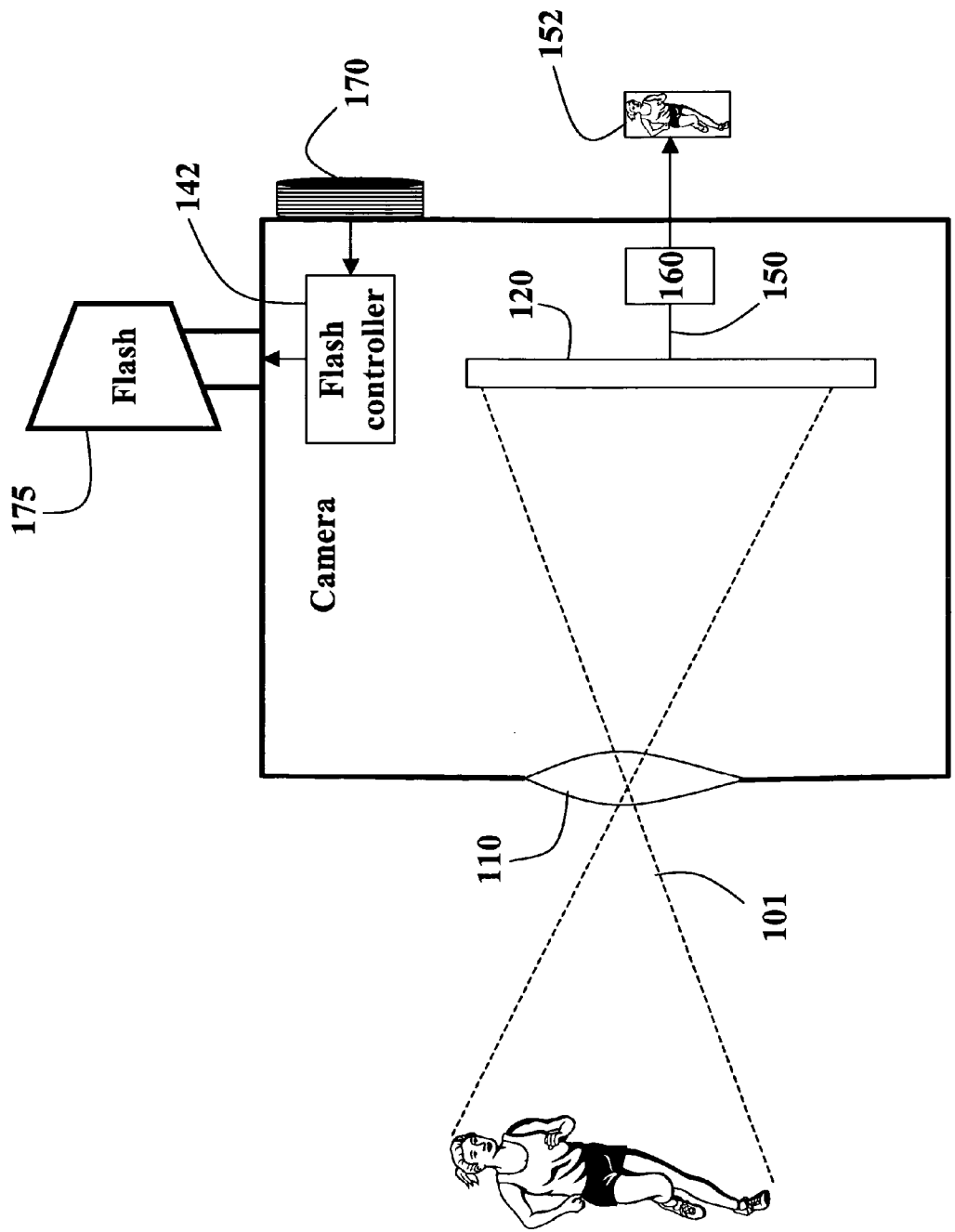

FIGS. 1A, 1B and 1C show simplified schematics of a deblurring camera according to embodiments of our invention. The camera includes a lens 110, a solid state image sensor 120, a shutter 130, and a shutter controller 140. In a preferred embodiment, the camera is a digital camera, and the sensor includes an array of pixels. The pixels can include RGB pixels interleaved in a Bayer grid. The camera can be a single photosensor. The camera can also be a digital video camera that produces a sequence of images or frames. An input image is produced on line 150 as a digital signal.

In the embodiment shown in FIG. 1B, the shutter functionality of FIG. 1A is implemented by a sensor controller 141 that can temporally turn the sensor 120 on and off while acquiring and integrating an input energy field 101. The energy field can be any type of electromagnetic radiation, e.g., visible or infrared light, or acoustic radiation, e.g., ultrasound and sonar.

In the embodiment shown in FIG. 1C, a flash unit 175 is 'fluttered' or strobed while the image is acquired.

All embodiments essentially modulate temporally the lightfield acquired by the sensor 120 according to a binary on and offsequence to generate the integrated blurred input image 150 during an exposure time.

Rather than leaving the shutter open for the total duration of the exposure time, we 'flutter' the shutter, open and closed, in a rapid irregular binary sequence or temporal pattern. Different binary sequences can be used for different images in a sequence of images. It should also be noted that the binary sequence can be arbitrary sequences of ons and offs, or pseudo-random sequences. That is, instead of just having a single on (open) followed by a single off (close) as in a conventional camera, the shutter is opened and closed multiple times, and the amount of time that the shutter is open and closed varies during the exposure duration.

We call the resultant image an encoded blur image I(x). The fluttering toggles the integration of motion on and off in such a way that the resultant point spread function (PSF), P(x), has a maximum coverage in the Fourier domain. In other words, the modulating with the binary on and off sequence results in a well-posed invertible Fourier transform of a resultant point spread function. In the camera embodiments without a shutter, the fluttering can be achieved by turning the sensor on and off while integrating, and sampling the sensor at the end of the exposure time. The 'fluttering' or modulation can also be achieved by rapidly turning the flash unit on and off. The fluttering of the sensor can also be combined with the fluttering of the strobe to achieve special effects.

The on/off switching time can be less than 100 microseconds. Typically, the total exposure time is about 200 milliseconds, and a coded exposure sequence includes, for example, about 52 switchings.

The observed blurred image is a convolution between the temporal integration of the modulated light field and the spatial object motion. Although the object motion is unknown a priori, the temporal pattern can be selected so that the convolved (blurred) image I(x) preserves the relatively higher spatial frequencies of moving objects and allows us to recover the spatial frequencies using a decoding process 160. The decoding process can be internal to the camera as shown, in which case an output image 152 is a deblurred image. Alternatively, the process 160 can be applied externally to a blurred input image.

Figure 1D:
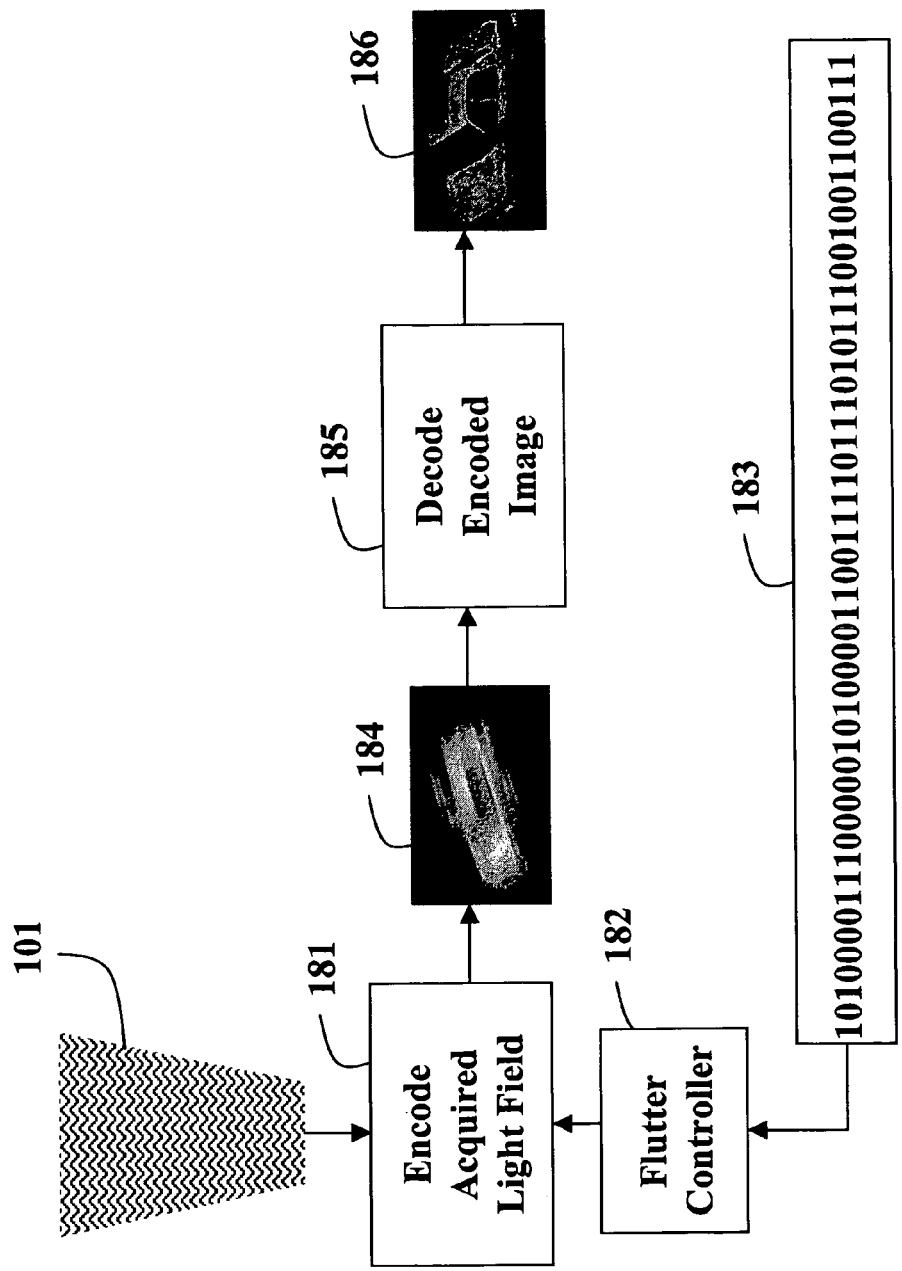
FIG. 1D is a flow diagram of a method for deblurring an image according an embodiment of the invention.

FIG. 1D shows a method for deblurring an input image according to an embodiment of the invention. The light field 101 of a scene is modulated and encoded 181 by a flutter controller 182 using an on/off encoding pattern 183 to produce an encoded and blurred input image 184. The encoded image is decoded 185 to produce a deblurred output image 186.

FIGS. 4A and 4B show before and after images of a moving taxi.

Motion Model

Figure 2:
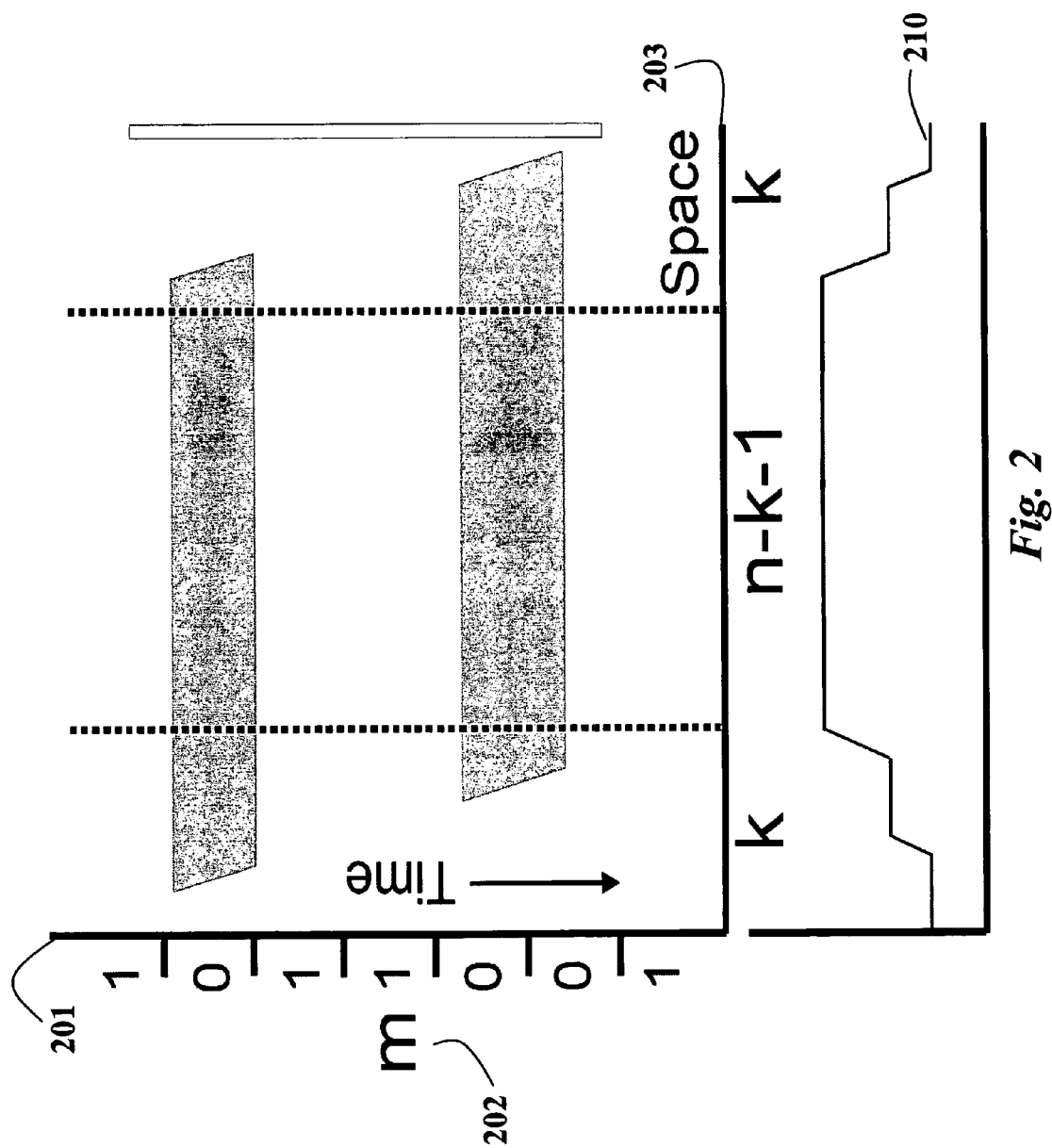
FIG. 2 is a schematic graph of an object moving over time and a resulting intensity profile.
Figure 3:
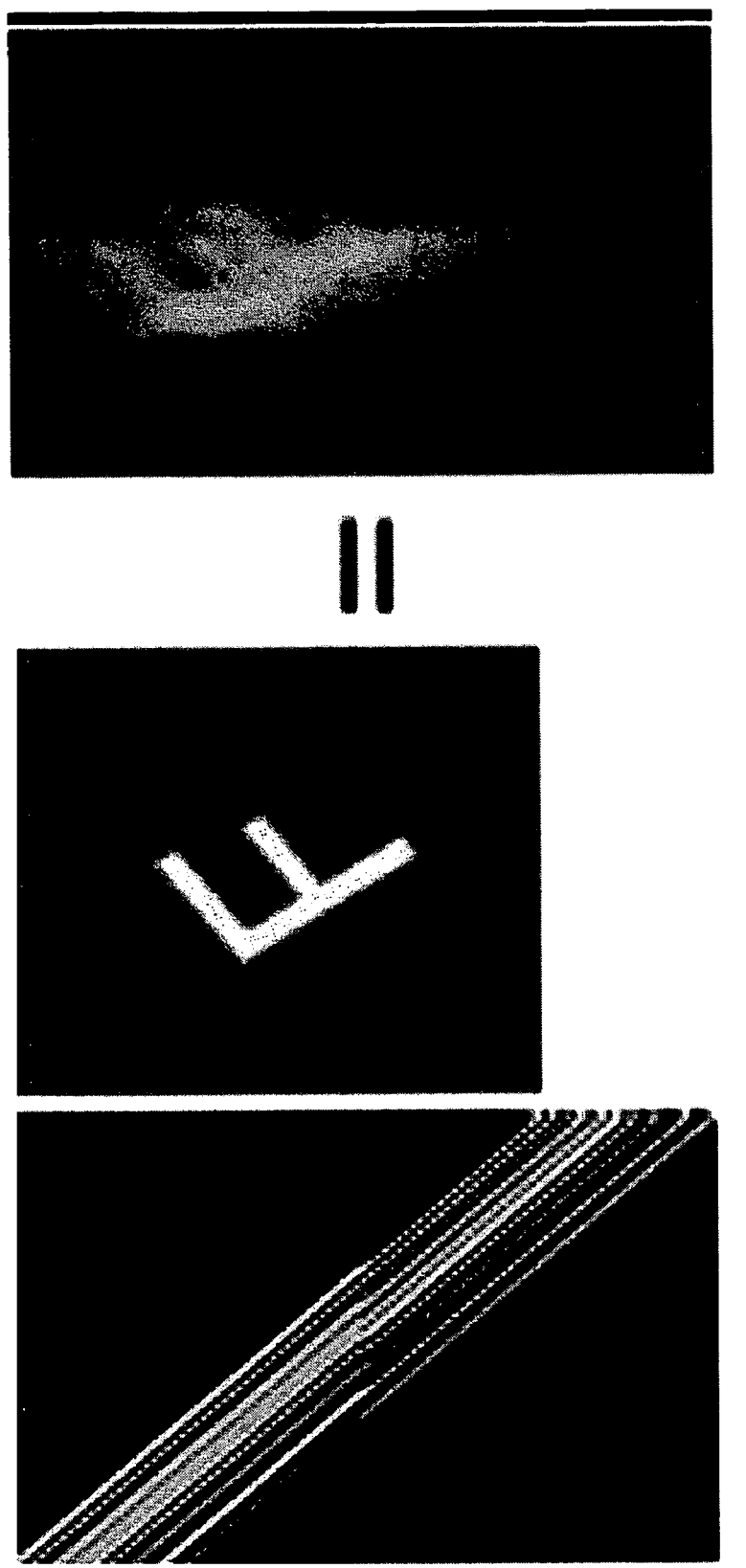
FIG. 3 is a schematic of a linear system for transforming an unknown image into a blurred image according to an embodiment of the invention.

For greater generality, we describe convolution using linear algebra as shown schematically in FIGS. 2 and 3. Let B denote the blurred input image pixel values. Each pixel of the image B is a linear combination of the intensities in the desired unblurred image, X, and can be written as:

$$AX=B+\eta. \quad (3)$$

The matrix A is denoted as a smearing matrix. The smearing matrix describes the convolution of the input image with the point spread function P(x) and $\eta$ represents a measurement uncertainty due to noise, quantization error, and model inaccuracies.

For two-dimensional PSFs, the matrix A is block-circulant, while for one-dimensional PSFs, the matrix A is circulant. For simplicity, we will describe the coding and decoding process for a one-dimensional PSF case, which can easily be extended to the two-dimensional case.

Given a finite exposure time of T seconds, we partition the integration or exposure time into m time slices, called chops, so that each chop is T/m seconds long. The on/off chop pattern is the binary sequence 183 of length m. The motion blur process is a time 201 to space 203 projection where, in the one-dimensional motion case, the motion in T seconds causes a linear blur of k pixels. Hence, within one single chop's duration, the smear covers k/m pixels.

As shown schematically in FIG. 2, consider a simple case of an object moving spatially upwards in front of a black background over time and evaluated along a vertical scan line. If the PSF is length k in image pixel coordinates, a pixel at a location (u, v) in the first chop is smeared linearly up to the pixel (u, v+k−1). If a length of the object along the direction of motion is n pixels, then the total blur width is w, where w=(n+k−1). Our goal is to determine a best estimate of n pixels from the observed n+k−1 pixels.

The smear matrix A can be obtained as follows. Each pixel in the unknown image X contributes to a total of k pixels after smearing. The first column of the circulant matrix A is the PSF vector of length k followed by n−1 zeros. Each subsequent column is obtained from the previous column by cyclically permuting the entries one step forward. Therefore, in case of a black background, the linear convolution with P(x) or multiplication by the circulant matrix A is equivalent to a circular convolution with a PSF vector of length k padded with n−1 zeros.

In practice, because X has only n unknown values in the smear direction, one can construct an over-constrained least square system by truncating the matrix A to the first n columns. Thus, the size of the matrix A becomes (n+k−1)×n. In the case of flat blur, the time-to-space projection of an input signal of length n with constant values generates a response with trapezoidal intensity profile. The ramps in the profile have a span of k pixels each, and a plateau is n−k−1 pixels long. For coded blur, the overall shape of an intensity profile is still trapezoidal, but the shutter's rapid flutter changes the ramps to a more jagged shape 210, as shown in FIG. 2.

Code Selection

Our goal is to select a temporal code that improves the invertibility of the imaging process. We analyze the invertibility by studying a condition number of the coding matrix and the variance of a frequency spectrum of the code.

The invertibility of the spreading matrix A, in the presence of uncertainty and noise, can be judged by the standard matrix conditioning analysis. The condition number is the ratio of the largest to the smallest singular value and indicates the sensitivity of the solution X to the noise $\eta$ in the input image B. We note that the eigenvalues of a circulant matrix comprise the magnitude of the discrete Fourier transform (DFT) of the first column of the circulant matrix, and that each column in the matrix A is the PSF vector padded with zeros. Based on this observation, we select a code sequence with a broadband frequency response so that the corresponding condition number for the smearing matrix is as large as possible.

In theory, we could modulate the opacity of the resulting filter continuously over time to achieve a broadband frequency response, e.g., using a chirp-like function. However, in practice a binary (on/off) opacity switching with fixed chop duration is easier to implement.

Choices for broadband binary codes include Walsh-Hadamard codes, maximum length sequences and modified uniform random array (MURA) codes. The MURA sequence may seem the obvious choice as its discrete Fourier transform is flat. However, for motion blurring, circular convolution occurs with the PSF vector of length k padded with n−1 zeros, where n is the length of the object in pixels along the direction of motion. As described below, a MURA is not optimal for zero padded patterns, and prompts us to search for a best possible code.

The DFT of a MURA pattern without zero padding is flat. However, the DFT can resolve with exactness only the discrete frequencies. There is spectral leakage for components falling between the DFT bins. Zero-padding results in greater resolution in the frequency components and reveals the weakness of MURA patterns.

Because the decoding involves inversion of the frequency spectrum, we also add a smoothness constraint to our search for the best binary chop pattern. The frequency response should have low variance so that an incorrect estimation of the PSF does not cause amplification of incorrect spatial frequencies during decoding. The frequency response of both the box filter sequence and the padded MURA sequence includes deep dips or zeros, producing a high variance for both. The spikes in the frequency domain lead to the spurious amplification.

To find a code with a low variance, broadband response, we performed an exhaustive search of the binary codes of length m 202. The linear search to find the flattest response involves finding a code with the smallest ratio between the largest frequency magnitude and the lowest frequency magnitude. In addition, we weight the solutions by their standard deviations.

Finally, we determine the length m of the sequence length 183. As described later, an ideal chop-count is equal to the blur size k. Ideally, the camera according to the embodiments of the invention has an auto-flutter mode to decide the length m on-the-fly, based on a sensed optical flow, a form of a motion-adaptation similar to an auto-focus feature. A compromise value can be determined by experimentation. We select a sequence of m=52 chops. The optimized code sequence that we found using exhaustive search is:

1010000111000001010000110011110111010111001001100111

Motion Decoding

Linear Solution

Given the estimated PSF, we can deblur the blurred image using known image deconvolution processes. However, in several cases described below, we discovered that adding more constraints is difficult via deconvolution, and instead a linear algebra process approach is more practical and preferred. We use a least-square estimation to solve for the deblurred image $\hat{X}$ as $$\hat{X}=A^{+}B, \quad (4)$$

where $A^+$ is the pseudo-inverse of the matrix A, in the least-square sense. Because the input image can have a motion blur k different from m, we first expand/shrink the given blurred image by factor m/k. Then, we estimate X and scale X back up to its original size by k/m.

In the following sections, we focus on one-dimensional PSFs. Motion of real-world objects within a frame tends to be one-dimensional due to energy and inertial constraints. We refer to the one-dimensional line-like paths for motion as motion lines. Note that scene features on a given motion line contribute only to pixels on that motion line, and therefore, the motion lines are independent.

A solution for each motion line can be determined independent of other motion lines. In the description below, without a loss of generality, the motion lines are assumed to be oriented along horizontal scan lines. However, in examples such as camera jitter, the PSF is typically a collection of 1-D manifolds in two-dimensions. Our method can extend to these PSFs as well.

In general, the deblurring process 160 needs to know which pixels belong to the blurred moving foreground region of the image and which belong to the unblurred static background region. A misclassification can lead to decoding errors where the unblurred background pixels contaminate the results along the entire motion line.

Figure 4C:
FIG. 4C is an image with a bounding box according to an embodiment of the invention.

The regions can be classified into blurred and unblurred areas using any known method. In the case of a stationary camera, a 'cut-out' or silhouette of the moving object can be obtained via frame differencing or by comparing the position of the moving object in two successive frames. In an interactive deblurring process, as shown in FIG. 4C, a user can specify an approximate axis-aligned bounding box 400 around the blurred object. Numerous techniques are known for localizing moving objects in images.

Figure 4D:
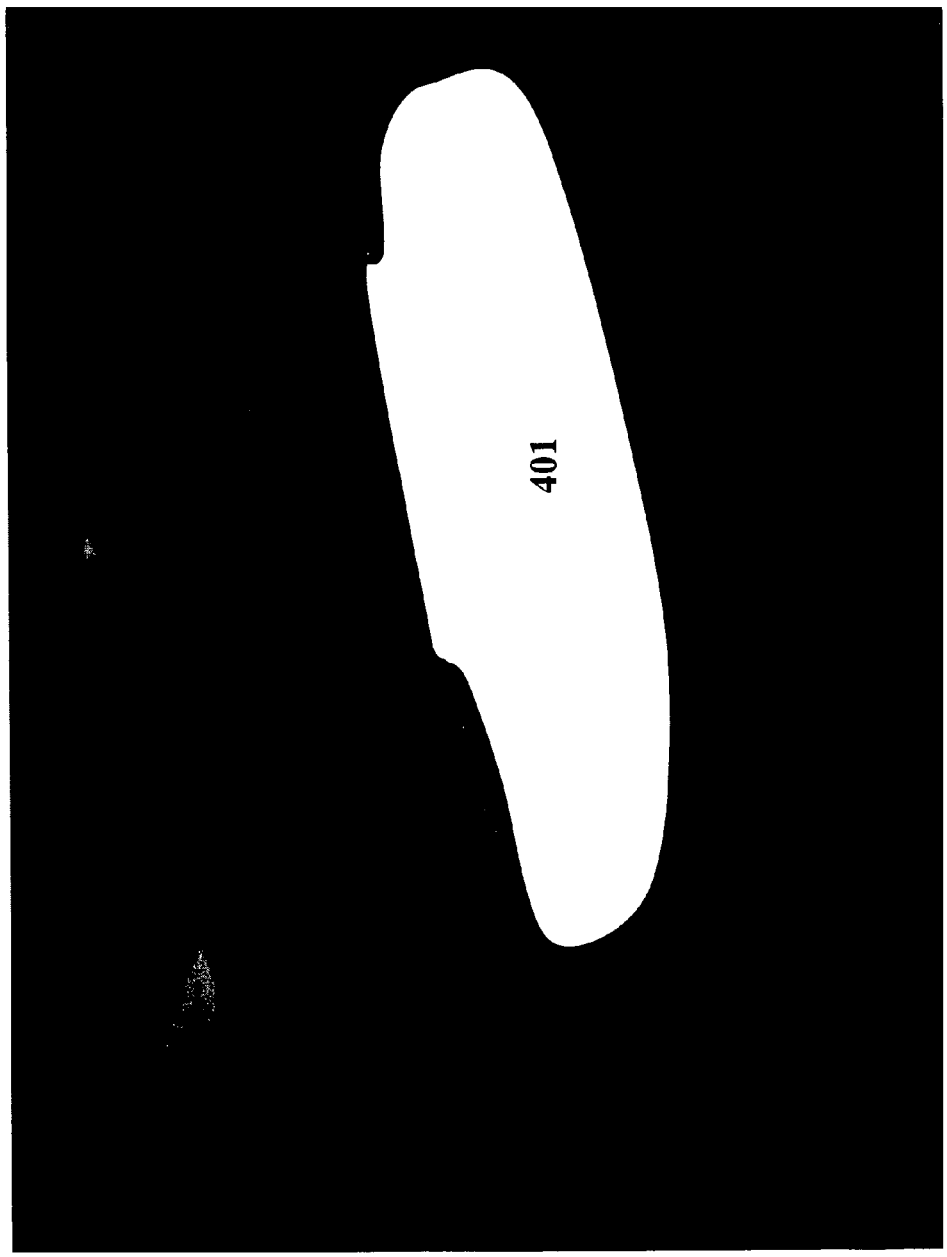
FIG. 4D is an image with a cut-out according to an embodiment of the invention.

The width of the bounding box, $w_b$, is typically slightly greater than the blur width w=(n+k−1). The user specifies the length of blur, k, which indicates that a shape of the object is n'=$w_b$−k+1. The value n' can be considered a close approximation of n. If the length differs along each motion line, then the user specifies a cut-out 401, as shown in FIG. 4D, rather than a bounding box.

Background Estimation

We now address the problem of motion blur due to an opaque object moving in front of a stationary non-blurred background. This is a common but difficult case, because the moving object tends to 'blend' with the background. It is insufficient to know the PSF of the moving object to deblur the image. We explore this problem, classify the cases and show that in some instances, the unknown background visible at the edges of the blurred object can be recovered during the deblurring process.

The blurred image is given by $$B=AX+A_g X_g, \quad (5)$$

where X is the moving foreground object, $X_g$ is the static background and $A_g$ is the background attenuation matrix whose elements attenuate the static background. The matrix $A_g$ can be written as $$A_g=I-\text{diag}(A^*I_{(n+k-1)}\times 1), \quad (6)$$

where $I_q \times 1$ is a vector of length q with all ones and diag(v) returns a square matrix by placing the vector v on the main diagonal.

The analysis of background estimation is based on the number of background of pixels, g, that contribute to the blurred region. In the blurred region of size (n+k−1), when n>k, the background is visible only near the edges and contributes to only 2k pixels.

However, when n<k, the object smears more than its length, and the background is partly visible in all the blurred pixels. Hence, g=min(2k, n+k−1). Given observations at (n+k−1) pixels, we estimate a minimum of n+2k values. The additional k+1 unknowns can be estimated by adding constraints on the object motion and on the complexity of the texture corresponding to the background image.

We consider the following cases for estimating the foreground X and background $X_g$:

1. wide object with known shape and textured background: n>k;
2. wide object with unknown shape: n>k and
   i. constant background;
   ii. textured background but with edges of the texture outside the blur region;
   iii. textured background with edges of the texture passing through the blur region; and
3. narrow object blurred over a distance greater than its length: n<k.

In Case 1, we constrain a specified blur region of length n'=n so that the specified cut-out precisely marks the shape of the blurred object. Because we know the precise location of the ramps of the trapezoidal contribution of the background pixels, we can construct the background attenuation matrix $A_g$. We estimate up to k−1 values from among the 2k possible values for the background by making a simplifying assumption that the background has a frequency.

In Case 2(i), the shape of the object is unknown. When the background is constant, we can treat the background as part of the moving object that generates the 'smeared' values. Only the task of estimating the single unknown background color remains. As each motion line is independent, we can recover a different background for each motion line. This estimation is possible only because our coded exposure method provides a respectable condition number of the smearing matrix A. For box-filtered or flat blur, the condition number is low and attempts to find this same estimate are very unstable. Several singular values of the smearing matrix are relatively small for a box-filter PSF, and as the number of unknowns increases, the linear solution becomes ill-conditioned.

In Case 2(ii), the background is not constant, but we can still recover the foreground when the edges of the background are outside the blurred region. We use a gradient domain method to eliminate variations in the background. The highest possible gradient in the foreground is attenuated by a factor of m/2 or more by the PSF. Hence, all the gradients along motion lines with a magnitude above 2/m are likely to be background edges and these gradients are set to zero. The motion line is reconstructed by integrating the modifying gradients starting from the foreground region outwards.

In Case 2(iii), the background edges are mixed with the foreground blur and are highly attenuated. We can only synthesize the background texture for this case.

In Case 3, every blurred pixel has a contribution from the background. Note that this case does not have a unique solution. Because the background attenuation is non-zero for all the pixels, we can obtain multiple solutions for X and $X_g$ that result in the same blurred image. Specifically, given a solution $X_1$ and $X_{g1}$, we can always find another solution $X_2$ and modify the background so that $$AX_1 + A_g X_{g1} = AX_2 + A_g X_{g2}. \quad (7)$$

The value $X_{g2}$ is then given by $$X_{g2} = (A_g)^{-1}(A(X_1 - X_2) + A_g X_{g1}).$$

Note that in other case n>k, because the background is not seen completely, and the background contribution matrix $A_g$ is not invertible.

Although we have focused on linear or iterative estimation of the physical values, other solutions can be obtained for visually pleasing results. Such techniques include texture synthesis, image inpainting, structure propagation, or capture of an unoccluded background or 'clean plate' image.

Simple Motion Generalization

By applying image warping, we enable our method 160 to decode a much broader set of simple motions that project as affine transforms, in plane rotations around a fixed center, as well as movement in perspective along lines that meet at a vanishing point. While the PSF of the encoded blur is initially nonlinear and position-dependent, most of the linear motions can be warped to produce an image with spatially invariant uniform-length displacement vectors aligned with image scan lines. As motion blur follows this same displacement vector field, the warped image provides uniform-width coded-blur regions that are now suitable for decoding. To produce the final result, we simply apply the inverse warp to return the decoded image to its original geometric form. In the case of perspective warp, rectification can be applied after estimating the vanishing point of motion lines. Following rectification, all the warped motion lines are parallel in the camera image space.

In-plane rotations, e.g., a rotating fan or swinging pendulum, generate motion lines that form concentric circles around the center of rotation. These can be handled by deblurring in polar coordinates.

Resynthesis

The deblurred results are beneficial to a wide range of applications. We describe examples of recreating artistic blur, and in the next section describe other applications.

Motion Bokeh

We can generate arbitrary motion blur from a single blurred image. Bokeh is a Japanese term traditionally used to describe varied, artistically controlled focus or glare effects within images. By using pin-holes or apertures with varied shapes, photographers can induce bright point-like objects to appear as discs, triangles, stars and other forms when these points are out of focus. The color and brightness of the out-of-focus regions contribute to the sense of a certain quality of light, and the feeling of the outdoors.

We generate Bokeh in temporal blur by using artist-selected chop-contributions. The flat blur due to box filtering generates an image in which most visual details are lost. Cartoon artists or car advertisers indicate motion by creating small streaks rather than by smearing the entire image with a box filter.

Figure 4E:
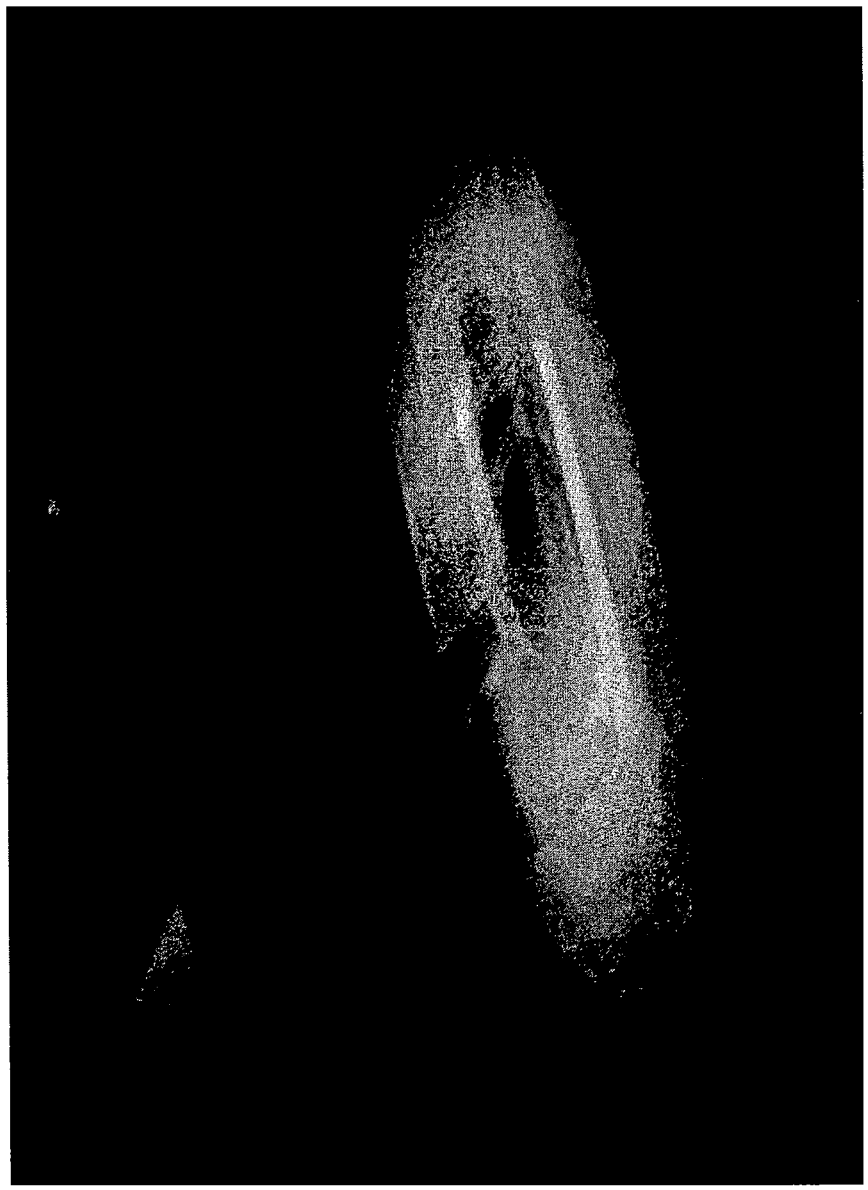
FIG. 4E is an image with a Bokeh effect according to an embodiment of the invention.

We can generate this image from deblurred pixels by excluding pixels with high gradient along the motion lines from the decoding. We smear this partial high gradient image. Note that the background appropriately 'peeks' through the streaks. We then superimpose this smeared image on a moderately blurred result, as shown in FIG. 4E.

Motion Paste

Figure 5:
FIG. 5 is an image with superimposed moving objects according to an embodiment of the invention.

As shown in FIG. 5, we can superimpose a new object between the recovered moving object and the background with appropriate motion-induced mixing of the three elements. To achieve this, we divide the target image temporally into a sequence with k individual chop images. For each chop, we position the original car and the inserted car with the linearly interpolated displacement for that chop. The three layers define the occlusion relationship. Then, we blend the generated k images using a desired PSF.

Applications

Camera Motion

Camera motion is conventionally resolved using a gyro-based physical stabilization of the optics. It is also possible to recover camera motion from blurred images caused by camera shake. In this case, the PSF is complex and a separate method may be needed to estimate the 2-D PSF. This can be achieved via accelerometers or gyroscopes embedded in the camera or with an auxiliary low resolution high frame rate camera. Because we assume shift invariance, i.e., all points share the same PSF, only a single feature needs to be tracked. For example, a point light source, e.g., a light emitting diode, can be placed in the field of view. The smear of the light is used as our PSF.

Partial Occlusion Removal

Motion blur widely distributes the colors of a moving object along its motion lines. If the moving object is partially occluded by a narrow and stationary foreground object, then we can still recover colors for all the partially occluded regions of the moving object. Techniques such as image inpainting 'hallucinate' the possible pixel values, but encoded blur enable us to encompass a completely observed system.

Figure 6A:
FIG. 6A is an image with an occluding object.
Figure 6B:
FIG. 6B is an image with the occluding object of FIG. 6A removed.

In the 1-D PSF case, if the blur width size is w and the partial occluder length is d then, of the n+k−1 pixels recorded, only n+k−1−d pixels are available to reconstruct the n pixels. If the blur size k is larger than the occluder length d, then all the missing d pixels can be recovered. FIG. 6B shows an image of a car recovered from a blurred image in FIG. 6A with a pole as the occluder.

We can analyze the encoded exposure in a discrete frequency domain and via matrix conditioning analysis. However, the relationship among the various elements: code sequence, code length, the blur length and the corresponding noise after decoding, can also a continuous domain. We optimize the binary code to improve the eigenvalues of the smearing matrix A by analyzing the discrete Fourier transform. We believe that the code according to the embodiments of the invention can have applications in other areas where a linear mixing model is inverted during decoding. We obtained our codes via exhaustive linear search. However, other searching techniques can also be used.

Deconvolution via coded exposure exhibits similarities to code division multiplexing and de-multiplexing of a single communication channel. Advances in CDMA field and simultaneous orthogonal codes or channel reception with background noise can improve and broaden results in coded blur photography as described herein. The coding and reconstruction has several similarities with tomography and coded-aperture imaging, and exploiting this relationship can yield further benefits in temporal image processing.

Effects

Extension to video cameras and motion video can improve motion estimation by exploiting the frame-to-frame coherence. Overlapped chops for two or more cameras enable a very fine temporal resolution as well. Similarly, methods to decode blur from overlapping motions of more than one object enable additional complex occlusion effects.

By dealing with general 3-D motion, incomplete sampling of individual image patches can be used for slow motion 'action replay' sequences in presence of motion blur as we describe for the case of partial occlusion.

Focus and depth also affects blur size in two dimensions. Thus, combining encoded focusing with encoded exposure can yield a decodable depth map based on maximized local variance in the image.

Ultrasound and Sonar

It should be noted that our modulating, sampling, and decoding techniques can also be in other fields such as ultrasound and sonar sensing. There, the sensed signal is low-pass filtered due to limitations of the device or because the sonar device moved. By using a temporal sampling code, the attenuation of high frequency components can be reduced.

Focus

Our high frequency sampling technique can also be used for other devices that cause a smear in an input image. For example, a lack of focus in a lens causes a defocused blurred image. By placing a high frequency pattern in front of the lens, the pixel blur can be encoded so that a focused sharp image can be recovered later during a decoding process.

PSF Computation

Encoded exposure can make PSF estimation easier to achieve. With flat blur, motion estimation is relatively difficult within a single frame. Because the encoded exposure preserves more of the high frequency components, an intra-frame optical flow process can be applied. Several techniques for analyzing motion from image sequences and videos are known. The encoded exposure video camera can greatly improve results on optical flow, PSF estimation and image stabilization. New rendering effects are also be possible by exploiting coherence in successive frames. The coherence can be used for improved background modeling to reduce interference in the background scene during the decoding operation.

Camera

In one implementation we use an externally triggered shutter. An internal implementation can start and stop integration of incident light at a pixel level of the sensor according to a globally distributed chop signal.

In this case, the R, G and B pixels can use a different binary code that exploits the Bayer grid, i.e., color sensor interleaving, for a finer spatio-temporal resolution. The codes can be held constant, or the code lengths can be adaptively selected based on intra-frame motion. The codes can also be used to controlled strobed lighting flashes. Thus, the techniques as described herein can be used in applications where objects move at very high speeds. Strobed pre-flashes can be effective for scene analysis and red-eye reduction. Extremely short flash duration is typically used to freeze scene motion, but a coded flash sequence provides greater ability to control motion sensing.

However, the PSF of motion with a coded flash sequence is modified by the presence of ambient light. The result is a linear combination of two PSFs: flat blur due to ambient lighting, and coded blur due to strobed lights. If the PSFs are orthogonally encoded, then it becomes possible to recover both flat blur and coded blur separately. Similarly, a combination of coded flashes and coded exposure in a multi-camera, multi-illumination arrangement can be useful for recovering moving silhouettes, self-shadowing, and occlusion ordering.

The cameras in FIGS. 1A, 1B and 1C can be equipped with a 'motion knob' 170 for manual control. Similar to auto-focus systems, the camera could also have an 'auto-flutter' facility, wherein the camera electronics can determine, on-the-fly, the best code sequence length and duration. For the embodiment of the invention as shown in FIG. 1C, the knob 170 can be used to manually control a flash controller 142 to set the coded flash sequence. An ultrasound sensor or an auxiliary low resolution camera can trigger fluttering by detecting and measuring object motion.

Analysis

Comparing the deconvolved output according to the embodiments of the invention with conventional methods is instructive.

Noise

The noise in our decoding process is due primarily to the amplification of high frequency components. The coded PSF is preserved, but moderately attenuates all but the lowest-frequency components. For the linear system Ax=b, assuming independent and identically distributed noise and variance $\sigma^2$, the covariance matrix $C_x$ of x is given by $$C_x = \sigma^2 (A^T A)^{-1} \quad (8)$$

For the 52 chop sequence 183, the resulting matrix $C_x$ is close to diagonal, with the maximum diagonal entry being equal to 77, for object sizes ranging from 100 to 1000 pixels. Thus, the noise amplification is around 18 db. In comparison, for flat blur, the maximum value of $C_x$ is 1474.9, which gives a noise amplification of 41.6 db.

Our method can deblur images to the extent of the motion within a single chop. Let us compare to an image captured with an exposure of a single chop, i.e., T/m seconds. As the cumulative exposure time for coded exposure is roughly T/2, SNR is potentially better by m/2 in the blurred region. However, the key advantage with respect to short exposure imaging is in the areas without motion blur, which do not need to be deblurred. Our system can record a sharp image with reduced noise.

Resolution

Binary code-selection has a large impact on the performance of the system. A long code, i.e., a large m, subdivides the exposure time finely and enables decoding of a large amount of blur, but is ineffective for small amounts of blur. Conversely, a short code has a longer duration per chop, and blur within a single chop cannot be resolved. We would like to keep the ratio k/m slightly larger than 1 pixel per chop to achieve a best possible sampling of the blur.

EFFECT OF THE INVENTION

Deblurring via a fluttered exposure sequence has several advantages. Encoded imaging methods, such as those used in astronomy or tomography, typically sense a raw image that is meaningless to a human observer. Fortunately, in our case, the encoded exposure image is useful even if it is not decoded successfully. Compared to flat blur, the image is, in the worst case, half blurred at half the intensity. The coded sequence is easy to implement because it requires toggling of binary opacity as opposed to a more complex continuous opacity control. In a digital camera, the binary switching process can be implemented directly with the shutter or on the sensing chip itself.

The embodiments of the invention provide a modification of the camera's temporal pattern of integration to enable practical deblurring of images. The selected flutter sequence in the time-domain preserves higher frequencies in the spatial domain for moving objects.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reducing blur in an image of a scene acquired by a camera, comprising the steps of:
    selecting an optimal temporally coded pattern;
    temporally modulating light of a scene acquired and integrated by a camera image sensor according to the temporally coded pattern during an exposure time to generate an encoded input image, wherein the exposure time has an arbitrary duration, and the temporally coded pattern is a binary on and off sequence with an arbitrary length; and
    decoding the encoded input image according to an inverse of the coded pattern to produce a decoded output image having a reduced blur.

2. The method of claim 1, in which the pattern is binary and has a maximum coverage in a Fourier domain.

3. The method of claim 1, in which the temporally coded pattern is an optimal binary code.

4. The method of claim 1, in which the exposure time is about 200 milliseconds, and the modulating opens and closes a camera shutter about 52 times during the exposure time.

5. The method of claim 1, in which the modulating is selected adaptively according to a sensed optical flow in the scene.

6. The method of claim 5, in which the optical flow is sensed in the camera.

7. The method of claim 5, in which the optical flow is sensed using an ultrasound sensor.

8. The method of claim 5, in which motion of the camera is sensed with an inertial sensor or a gyroscope.

9. The method of claim 1, in which temporally coded pattern opens and closes a shutter of the camera according to a binary sequence 1010000111000001010000110011110111010111001001100111.

10. The method of claim 1, further comprising:
    scaling the input image by a factor of m/k;
    determining an estimated output image; and
    scaling the estimated output image by a factor of k/m to obtain an output image, in which m is the number of ons and offs in the binary sequence, and k is the length of a point spread function vector equal to a number of pixels in a scan line of the camera image sensor.

11. The method of claim 1, further comprising:
    determining automatically a color of a background region and a color of a moving object in the input image.

12. The method of claim 1, further comprising:
    determining a static background region in the input image; and
    determining a foreground region in the input image including a moving object.

13. The method of claim 12, in which the foreground region is specified by a rectangular bounding box.

14. The method of claim 12, in which the foreground region is specified by an irregularly shaped cut-out.

15. The method of claim 12, further comprising:
    reducing an effect of the static background by excluding pixels in the input image along motion lines having a relatively high gradient.

16. The method of claim 1, further comprising:
    removing from the input image a static object occluding a blurred moving object.

17. The method of claim 1, in which temporal blur in the input image is modified during a post-processing step to achieve novel synthesis effects.

* * * * *